US012776492B2

(12) United States Patent
Kojima et al.

(10) Patent No.: US 12,776,492 B2
(45) Date of Patent: Oct. 27, 2026

(54) ELECTRODE LAYER AND ALL-SOLID-STATE BATTERY

(71) Applicant: Panasonic Intellectual Property Management Co., Ltd., Osaka (JP)

(72) Inventors: Toshiyuki Kojima, Kyoto (JP); Shuzo Tsuchida, Nara (JP); Akihiro Horikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 912 days.

(21) Appl. No.: 17/719,440

(22) Filed: Apr. 13, 2022

(65) Prior Publication Data

US 2022/0416251 A1 Dec. 29, 2022

(30) Foreign Application Priority Data

Apr. 26, 2021 (JP) ................................ 2021-074425

(51) Int. Cl.
*H01M 4/62* (2006.01)
*H01M 4/02* (2006.01)
(Continued)

(52) U.S. Cl.
CPC ........... *H01M 4/625* (2013.01); *H01M 4/623* (2013.01); *H01M 10/0562* (2013.01); (Continued)

(58) Field of Classification Search
CPC ........................ H01M 2004/028; H01M 4/624
See application file for complete search history.

(56) References Cited

U.S. PATENT DOCUMENTS 11,056,725 B2 * 7/2021 Son ....................... H01M 4/387
11,444,319 B2 * 9/2022 Kojima ............ H01M 10/0585
(Continued)

FOREIGN PATENT DOCUMENTS

JP 2009-283416 A 12/2009
JP 2010-262764 11/2010
(Continued)

OTHER PUBLICATIONS

Office Action dated Apr. 23, 2026, issued in counterpart CN Application No. 202210413044.1, with English translation. (14 pages).

*Primary Examiner* — Maria Laios
(74) *Attorney, Agent, or Firm* — WHDA, LLP

(57) ABSTRACT

A positive electrode layer is to be used in an all-solid-state battery, and includes a positive electrode current collector; a positive electrode junction layer including at least a conductive agent and disposed on the positive electrode current collector; and a positive electrode material mixture layer disposed on the positive electrode junction layer and including at least a positive electrode active material including a plurality of particles, a solid electrolyte having ion conductivity, and a plurality of conductive fibers. The plurality of conductive fibers include a conductive fiber that is positioned to connect adjacent particles of the positive electrode active material. A concentration of a binder included in the positive electrode material mixture layer is 100 ppm or less, and a concentration of a solvent included in the positive electrode material mixture layer is 50 ppm or less.

7 Claims, 1 Drawing Sheet

(51) Int. Cl.
*H01M 10/0562* (2010.01)
*H01M 10/0525* (2010.01)

(52) U.S. Cl.
CPC .. *H01M 2004/021* (2013.01); *H01M 10/0525* (2013.01); *H01M 2300/0068* (2013.01)

(56) References Cited

U.S. PATENT DOCUMENTS

| | | | | |
|---|---|---|---|---|
| 2009/0123837 | A1* | 5/2009 | Gratzel | H01M 4/131 429/209 |
| 2014/0170503 | A1 | 6/2014 | Yushin et al. | |
| 2015/0249265 | A1 | 9/2015 | Matsumura et al. | |
| 2016/0072120 | A1 | 3/2016 | Mizutani | |
| 2018/0226681 | A1* | 8/2018 | Hasegawa | H01M 10/052 |
| 2020/0212479 | A1 | 7/2020 | Kojima et al. | |
| 2020/0212499 | A1 | 7/2020 | Horikawa et al. | |
| 2020/0287208 | A1* | 9/2020 | Komura | H01M 10/0562 |
| 2021/0050585 | A1 | 2/2021 | Nakano et al. | |

FOREIGN PATENT DOCUMENTS

| | | | |
|---|---|---|---|
| JP | 2010262764 | A * | 11/2010 |
| JP | 2016-058277 | | 4/2016 |
| JP | 2018-125260 | | 8/2018 |
| JP | 2018-200804 | A | 12/2018 |
| JP | 2020-109747 | | 7/2020 |
| JP | 2020-109748 | | 7/2020 |

* cited by examiner

ELECTRODE LAYER AND ALL-SOLID-STATE BATTERY

BACKGROUND

1. Technical Field

The present disclosure relates to an electrode layer used in an all-solid-state battery and an all-solid-state battery.

2. Description of the Related Art

In recent years, development of a secondary battery that can be repeatedly used has been required due to weight reduction, cordless extension, or the like of electronic devices such as personal computers and mobile phones. Examples of the secondary battery include a nickel cadmium battery, a nickel hydrogen battery, a lead-acid storage battery, and a lithium ion battery. Among these batteries, the lithium ion battery has characteristics such as a light weight, a high voltage, and a high energy density, and is thus attracting attention.

As well in an automobile field such as an electric vehicle or a hybrid vehicle, the development of a secondary battery having a high battery capacity is regarded as important, and a demand for the lithium ion battery tends to increase.

The lithium ion battery includes a positive electrode layer, a negative electrode layer, and an electrolyte disposed between the positive electrode layer and the negative electrode layer, and a solid electrolyte or an electrolyte solution obtained by dissolving a supporting salt such as lithium hexafluorophosphate in an organic solvent is used for the electrolyte. Currently, a widely used lithium ion battery is combustible since the electrolytic solution containing the organic solvent is used. Therefore, a material, a structure, and a system for ensuring the safety of the lithium ion battery are required. On the other hand, it is expected that by using a nonflammable solid electrolyte as the electrolyte, the material, the structure, and the system described above can be simplified, and it is considered that an energy density can be increased, a manufacturing cost can be reduced, and productivity can be improved. Hereinafter, a battery using the solid electrolyte will be referred to as an "all-solid-state battery".

The solid electrolyte can be roughly classified into an organic solid electrolyte and an inorganic solid electrolyte. In general, as a solid electrolyte to be used for a solid electrolyte layer and a solid electrolyte to be used for forming the positive electrode layer or the negative electrode layer together with an active material, an inorganic solid electrolyte having high ion conductivity at a normal temperature (for example, 25° C.) is mainly used. Examples of the inorganic solid electrolyte include, for example, an oxide-based solid electrolyte, a sulfide-based solid electrolyte, and a halide-based solid electrolyte. The ion conductivity of these inorganic solid electrolytes at 25° C. is, for example, about $10^{-4}$ S/cm to $10^{-2}$ S/cm. Japanese Patent Unexamined Publication No. 2020-109747 (JP '747) discloses an all-solid-state battery using an inorganic solid electrolyte in a solid electrolyte layer, a positive electrode layer, and a negative electrode layer.

SUMMARY

An electrode layer according to an aspect of the present disclosure is an electrode layer to be used in an all-solid-state battery. The electrode layer includes an electrode current collector; an electrode junction layer including at least a conductive agent and disposed on the electrode current collector; an electrode material mixture layer disposed on the electrode junction layer and including at least an electrode active material including a plurality of particles, a solid electrolyte having ion conductivity, and a plurality of conductive fibers. The plurality of conductive fibers include a first conductive fiber positioned to connect adjacent particles of the electrode active material, a concentration of a binder contained in the electrode material mixture layer is 100 ppm or less, and a concentration of a solvent contained in the electrode material mixture layer is 50 ppm or less.

DETAILED DESCRIPTION OF PREFERRED EMBODIMENTS

Figure 1:
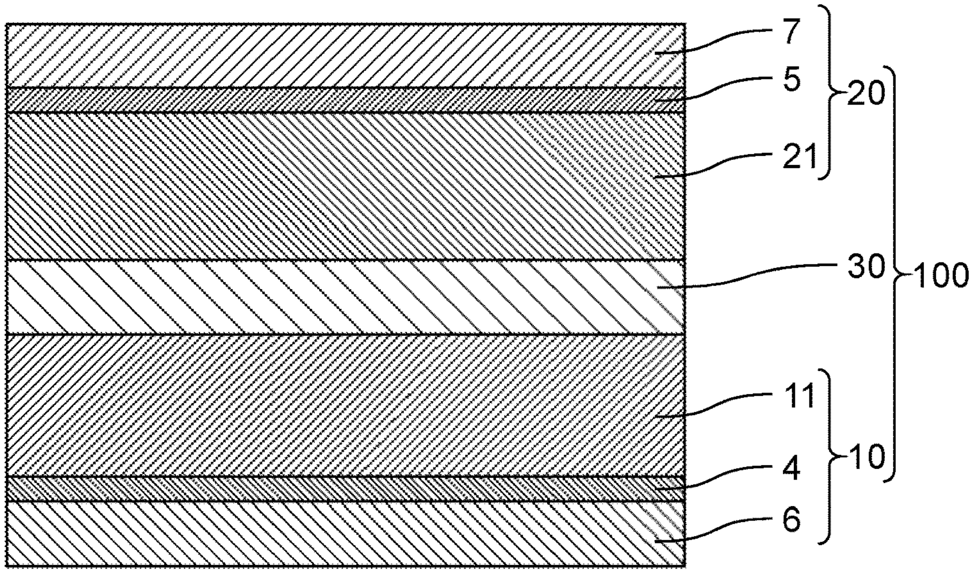
FIG. 1 is a schematic cross-sectional view of an all-solid-state battery according to an embodiment.

Since an electrode layer such as a positive electrode layer has a structure in which a binder for adhering a material is not used, a binder as an insulating material that obstructs an operation of a battery is removed, and a battery capacity of an all-solid-state battery can be improved. For example, the all-solid-state battery disclosed in JP '747 includes an electrode layer such as a positive electrode layer and a negative electrode layer that do not include a binder in order to improve battery characteristics. In the electrode layer including no binder, for example, a solid electrolyte functions as a binder and the strength of the electrode layer is maintained to some extent, but in order to improve reliability of the battery, it is required to further improve the strength. In order to further improve the battery capacity, it is necessary to ensure the strength of the electrode layer even when an amount of the solid electrolyte functioning as a binder is reduced.

Therefore, the present disclosure is to provide, for example, an electrode layer that can achieve both high capacity of an all-solid-state battery and strength maintenance of an electrode layer.

(Outline of Present Disclosure)

An outline of one embodiment of the present disclosure is as follows.

An electrode layer according to an aspect of the present disclosure is an electrode layer to be used in an all-solid-state battery. The electrode layer includes an electrode current collector; an electrode junction layer including at least a conductive agent and disposed on the electrode current collector; an electrode material mixture layer disposed on the electrode junction layer and including at least an electrode active material including a plurality of particles, a solid electrolyte having ion conductivity, and a plurality of conductive fibers. The plurality of conductive fibers include a first conductive fiber positioned to connect adjacent particles of the electrode active material, a concentration of a binder contained in the electrode material mixture layer is 100 ppm or less, and a concentration of a solvent contained in the electrode material mixture layer is 50 ppm or less.

Accordingly, the battery capacity is improved since the electrode material mixture layer substantially includes no binder and solvent. The elongated first conductive fiber is entangled with the adjacent particles of the electrode active material by being positioned to connect the adjacent particles of the electrode active material, and thus the strength of the electrode material mixture layer is improved. Therefore, the strength of the electrode material mixture layer that substantially include no binder for adhering a material of the electrode material mixture layer is maintained. Since the plurality of conductive fibers have conductivity, the plurality of conductive fibers do not inhibit electron conduction in the electrode material mixture layer. Therefore, the electrode layer according to the present aspect can achieve both the high capacity of the all-solid-state battery and the strength maintenance of the electrode layer.

For example, the first conductive fiber may pass through the solid electrolyte between the adjacent particles of the electrode active material.

Accordingly, the first conductive fiber is also entangled with the solid electrolyte between the particles of the electrode active material and connects the particles of the electrode active material, and thus the strength of the electrode material mixture layer can be improved.

For example, the electrode layer may be a positive electrode layer or a negative electrode layer.

Accordingly, a positive electrode layer or a negative electrode layer that can achieve both the high capacity of the all-solid-state battery and the strength maintenance of the electrode layer can be provided.

For example, the plurality of conductive fibers may include a conductive fiber having a fiber diameter of 30 nm or less and a fiber length of 300 times or more the fiber diameter.

Accordingly, the plurality of conductive fibers are easily entangled with the material of the electrode material mixture layer, and the strength of the electrode material mixture layer can be effectively improved.

For example, the plurality of conductive fibers may include a second conductive fiber located at an interface between the electrode junction layer and the electrode material mixture layer and connecting the electrode junction layer and the electrode active material, and a third conductive fiber located at the interface between the electrode junction layer and the electrode material mixture layer and connecting the electrode junction layer and the solid electrolyte.

Accordingly, the second conductive fiber and the third conductive fiber are entangled with a material of the electrode material mixture layer and a material of the electrode junction layer by being positioned so as to connect the material of the electrode material mixture layer and the material of the electrode junction layer, and adhesion between the electrode junction layer and the electrode material mixture layer is reinforced. Therefore, an adhesive strength at the interface between the electrode junction layer and the electrode material mixture layer is improved.

For example, a content of the plurality of conductive fibers in the electrode material mixture layer may be 1% by weight or less with respect to a total weight of the electrode material mixture layer.

Accordingly, a decrease of ion conductivity in the electrode material mixture layer is prevented by the plurality of conductive fibers having no ion conductivity, and it is possible to prevent a decrease in battery capacity.

An all-solid-state battery according to an aspect of the present disclosure includes the above electrode layer.

Accordingly, since the all-solid-state battery includes the electrode layer, an all-solid-state battery that can achieve both the high capacity of the all-solid-state battery and the strength maintenance of the electrode layer can be provided.

Hereinafter, the all-solid-state battery according to the embodiment will be described in detail. Each of the embodiments to be described below shows a comprehensive or specific example. Numerical values, shapes, materials, constituent elements, arrangement positions and connection forms of the constituent elements, processes, and the like described in the following embodiments are examples, and are not intended to limit the present disclosure.

In addition, in the present description, terms indicating a relationship between elements such as a parallel relationship, terms indicating a shape of the element such as a rectangle shape, and numerical value ranges are not expressions expressing only strict meanings, and are expressions that mean substantially equivalent ranges, for example, a difference of about several percent is included.

Each drawing is a schematic view that is appropriately emphasized, omitted, or adjusted in proportion to show the present disclosure, and is not necessarily exactly illustrated and may differ from an actual shape, positional relationship, and ratio. In the drawings, substantially the same components are denoted by the same reference numerals, and redundant description may be omitted or simplified.

In the present description, terms "up" and "down" in the configuration of the all-solid-state battery do not refer to an upward direction (vertically upward direction) and a downward direction (vertically downward direction) in absolute space recognition, and are used as terms that are defined by a relative positional relationship based on a laminating order in a laminated configuration. Further, the terms "up" and "down" are applied not only to a case where two constituent elements are arranged in close contact with each other and the two constituent elements come into contact with each other, but also to a case where the two constituent elements are arranged with a gap therebetween and another constituent element is present between the two constituent elements.

In the present description, a cross-sectional view is a view showing a cross section in a case where a central portion of the all-solid-state battery is cut in a laminating direction, that is a thickness direction of each layer.

(Embodiment)

[1. All-Solid-State Battery]

All-solid-state battery 100 according to the present embodiment will be described with reference to FIG. 1. FIG. 1 is a schematic cross-sectional view of all-solid-state battery 100 according to the present embodiment. In FIG. 1, materials included in respective layers of all-solid-state battery 100 and fine structures of the respective layers are not shown.

As shown in FIG. 1, all-solid-state battery 100 according to the present embodiment includes, for example, positive electrode layer 10, negative electrode layer 20, and solid electrolyte layer 30. Positive electrode layer 10 includes positive electrode current collector 6, positive electrode junction layer 4 formed on positive electrode current collector 6, and positive electrode material mixture layer 11 formed on positive electrode junction layer 4. Negative electrode layer 20 includes negative electrode current collector 7, negative electrode junction layer 5 formed on negative electrode current collector 7, and negative electrode material mixture layer 21 formed on negative electrode junction layer 5. Solid electrolyte layer 30 is disposed between positive electrode material mixture layer 11 and negative electrode material mixture layer 21. All-solid-state battery 100 has a structure in which positive electrode current collector 6, positive electrode junction layer 4, positive electrode material mixture layer 11, solid electrolyte layer 30, negative electrode material mixture layer 21, negative electrode junction layer 5 and negative electrode current collector 7 are laminated in this order.

All-solid-state battery 100 is manufactured, for example, by the following manufacturing method. First, positive electrode layer 10 and negative electrode layer 20 having the above-described configuration, and solid electrolyte layer 30 disposed between positive electrode layer 10 and negative electrode layer 20 are formed. Then, all-solid-state battery 100 is manufactured by pressing from outer sides of positive electrode current collector 6 and negative electrode current collector 7 at, for example, 100 MPa or more and 1,000 MPa or less.

Details of the respective layers will be described below.

[2. Positive Electrode Layer]

Figure 2:
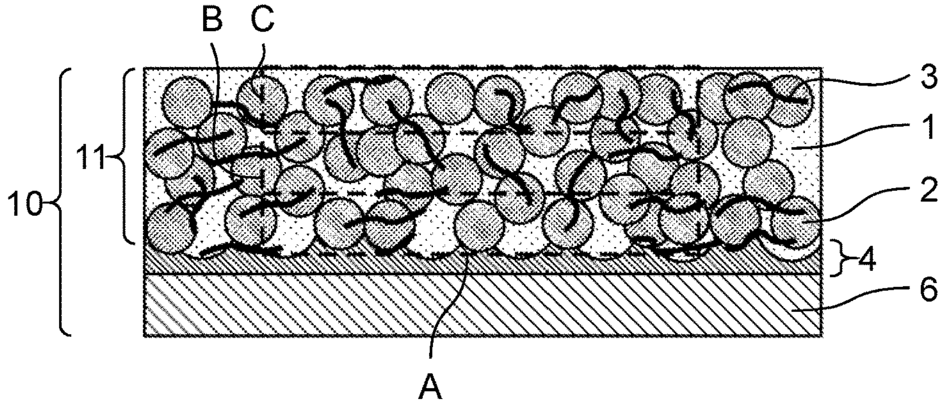
FIG. 2 is a schematic view showing a cross section of a positive electrode layer according to the embodiment.

Positive electrode layer 10 according to the present embodiment will be described with reference to FIG. 2. FIG. 2 is a schematic view showing a cross section of positive electrode layer 10 according to the present embodiment.

Positive electrode layer 10 according to the present embodiment includes, for example, positive electrode current collector 6 made of metal foil or the like, positive electrode junction layer 4 formed on positive electrode current collector 6, and positive electrode material mixture layer 11 formed on positive electrode junction layer 4. In the present embodiment, positive electrode material mixture layer 11 includes plural conductive fibers 3. Positive electrode layer 10 is an example of the electrode layer, positive electrode junction layer 4 is an example of the electrode junction layer, and positive electrode material mixture layer 11 is an example of the electrode material mixture layer.

[2.1. Positive Electrode Material Mixture Layer]

Positive electrode material mixture layer 11 includes at least positive electrode active material 2, solid electrolyte 1 and plural conductive fibers 3. Positive electrode active material 2 is an example of the electrode active material. Positive electrode material mixture layer 11 does not include, for example, a binder that serves as an adhesive for adhering materials of positive electrode material mixture layer 11 to each other. Here, the fact that the binder is not included means that substantially no binder is included, and means that a concentration of a binder included in positive electrode material mixture layer 11 is 100 ppm or less.

Positive electrode material mixture layer 11 does not include, for example, a solvent (specifically, an organic solvent). Here, the fact that the solvent is not included means that substantially no solvent is included, and means that a concentration of a solvent included in positive electrode material mixture layer 11 is 50 ppm or less.

[2.1.1. Conductive Fibers]

Positive electrode material mixture layer 11 includes plural conductive fibers 3 as described above. Plural conductive fibers 3 improve the strength of positive electrode material mixture layer 11.

Since positive electrode material mixture layer 11 does not include the binder that serves as an adhesive, solid electrolyte 1 serves as an adhesive.

Solid electrolyte 1 and positive electrode active material 2 in positive electrode material mixture layer 11 are adhered to each other due to an anchor effect caused by solid electrolyte 1 being embedded in positive electrode active material 2.

Solid electrolytes 1 in positive electrode material mixture layer 11 are adhered by sintering solid electrolytes 1.

In order to further increase the battery capacity, when an amount of positive electrode active material 2 is increased and an amount of solid electrolyte 1 serving as a binder is decreased, the strength of positive electrode material mixture layer 11 decreases. Plural conductive fibers 3 having an elongated shape improve the strength of positive electrode material mixture layer 11 by being entangled with positive electrode active material 2 and solid electrolyte 1. In the present embodiment, the fact that conductive fibers 3 are entangled means, for example, that a part of conductive fibers 3 is in contact with a surface of a target material or is in contact with and embedded in the surface of the target material. In addition, the fact that conductive fibers 3 are entangled means that conductive fibers 3 are present so as to pass through an inside of the target material.

Plural conductive fibers 3 include, for example, the following conductive fiber 3.

A certain conductive fiber 3 is positioned so as to connect, for example, positive electrode active material 2 and solid electrolyte 1. Conductive fiber 3 is entangled with positive electrode active material 2 and solid electrolyte 1, and connects positive electrode active material 2 and solid electrolyte 1.

Another certain conductive fiber 3 connects, for example, adjacent particles of positive electrode active material 2. Conductive fiber 3 is entangled with adjacent particles of positive electrode active material 2, and thus connects adjacent particles of positive electrode active materials 2 to each other. The particles of positive electrode active material 2 connected by conductive fiber 3 may be adjacent to each other.

Conductive fiber 3 connecting the adjacent particles of positive electrode active material 2 is an example of the first conductive fiber. Conductive fiber 3 may pass through solid electrolyte 1 located between adjacent particles of positive electrode active material 2, and connect the adjacent particles of positive electrode active material 2 to each other. Accordingly, since conductive fiber 3 is also entangled with solid electrolyte 1 between the particles of positive electrode active material 2, the strength of positive electrode material mixture layer 11 can be further improved.

In this way, plural conductive fibers 3 are entangled with solid electrolyte 1 and positive electrode active material 2, and thus the strength of positive electrode material mixture layer 11 is improved. Therefore, the strength of positive electrode layer 10 is reinforced.

Plural conductive fibers 3 have conductivity. Therefore, conductive fibers 3 do not inhibit battery performances. As a result, both the improvement of the battery capacity of all-solid-state battery 100 and the strength maintenance of positive electrode layer 10 are achieved.

Plural conductive fibers 3 include, for example, conductive fiber 3 that has a fiber diameter of 30 nm or less and a fiber length of 300 times or more the fiber diameter (that is, the fiber diameter:the fiber length is 1:300 or more). The fiber diameter and the fiber length are measured, for example, by observation with an electron microscope or the like.

Plural conductive fibers 3 may have an average fiber diameter of 30 nm or less, and an average ratio of the fiber length to the fiber diameter may be 300 or more.

Since the fiber diameter of conductive fibers 3 is 30 nm or less, conductive fibers 3 are easily entangled with the material of positive electrode material mixture layer 11 due to the flexibility of conductive fibers 3, and the strength of positive electrode material mixture layer 11 can be effectively improved. Further, since the fiber length is 300 times or more the fiber diameter of conductive fibers 3, the fiber length becomes longer, conductive fibers 3 are easily entangled with the material of positive electrode material mixture layer 11, and the strength of positive electrode material mixture layer 11 can be effectively improved.

The above-described fiber diameter is, for example, 1 nm or more. Accordingly, breakage and the like of conductive fibers 3 are less likely to occur, and the strength of positive electrode material mixture layer 11 can be effectively improved. The above-described ratio of the fiber length to the fiber diameter is, for example, 10,000 or less. Accordingly, the handleability of conductive fibers 3 is improved.

Plural conductive fibers 3 include, for example, conductive fiber 3 that has a fiber length of 1,000 nm or more and 10,000 nm or less. Accordingly, both the strength of positive electrode material mixture layer 11 and the handleability of conductive fibers 3 can be achieved.

Plural conductive fibers 3 include, for example, conductive fiber 3 in which a ratio of a fiber length thereof to an average particle size of positive electrode active material 2 is 1 or more and 3 or less. Accordingly, both the strength of positive electrode material mixture layer 11 and the handleability of conductive fibers 3 can be achieved.

Examples of a material of conductive fibers 3 include, for example, a conductive carbon material. Examples of the conductive carbon material include, for example, carbon nanotubes and carbon nanofibers. Other examples of the material of conductive fibers 3 include, for example, a fiber that imparts conductivity to cellulose nanofibers. The fiber that imparts conductivity to cellulose nanofibers is, for example, a fiber in which a conductive polymer is compounded with the cellulose nanofibers.

Plural conductive fibers 3 are uniformly distributed, for example, in a thickness direction in positive electrode material mixture layer 11. When region A in positive electrode material mixture layer 11 near positive electrode junction layer 4, central region B in positive electrode material mixture layer 11, and region C in positive electrode material mixture layer 11 near a surface opposite to positive electrode junction layer 4 side are set, a difference in content of plural conductive fibers 3 per unit volume in each region is within 2 times. Therefore, the entire positive electrode material mixture layer 11 is reinforced. Thus, it is possible to reduce the isolation of positive electrode active material 2 caused by cracking of positive electrode material mixture layer 11, that is, generation of positive electrode active material 2 that is not utilized, and it is possible to restrict a capacity decrease of all-solid-state battery 100. Region A, region B, and region C are, for example, regions obtained by dividing positive electrode material mixture layer 11 evenly into three parts in the thickness direction thereof.

For example, by forming positive electrode material mixture layer 11 using a method in which the material of positive electrode material mixture layer 11 is uniformly mixed instead of being mixed with the solvent and then is directly applied onto positive electrode junction layer 4, plural conductive fibers 3 can be uniformly distributed in the thickness direction of positive electrode material mixture layer 11. This is because floating or sinking of conductive fibers 3 due to a difference in specific gravity between positive electrode active material 2 and solid electrolyte 1 does not occur since no solvent is used. When a conductive carbon material is used for conductive fibers 3, conductive fibers 3 tend to float in a solvent since a specific gravity of conductive fibers 3 is light.

On the other hand, when positive electrode material mixture layer 11 is formed by a method of applying a slurry, in which the material of positive electrode material mixture layer 11 is dispersed in a solvent, onto positive electrode junction layer 4 and drying the slurry, conductive fibers 3 having a specific gravity different from those of positive electrode active material 2 and solid electrolyte 1 float or sink during drying, and plural conductive fibers 3 are unevenly distributed in positive electrode material mixture layer 11. For example, when conductive fibers 3 float due to the light specific gravity thereof, plural conductive fibers 3 are distributed more in region A and less in region C. Therefore, the effect of improving the strength of positive electrode material mixture layer 11 near positive electrode junction layer 4 is reduced.

A content of plural conductive fibers 3 in positive electrode material mixture layer 11 is, for example, 0.01% by weight or more and 1% by weight or less with respect to a total weight of positive electrode material mixture layer 11. Since the content of plural conductive fibers 3 is 1% by weight or less, conductive fibers 3 having no ion conductivity restrict the decrease in ion conductivity in positive electrode material mixture layer 11, and it is possible to restrict a decrease in battery capacity. Since the content of plural conductive fibers 3 is 0.01% by weight or more, positive electrode material mixture layer 11 can be effectively reinforced. The content of plural conductive fibers 3 in positive electrode material mixture layer 11 may be 0.3% by weight or less with respect to the total weight of positive electrode material mixture layer 11. As a result, the cost can be reduced by reducing an input amount of conductive fibers 3 while sufficiently achieving the effect of reinforcing positive electrode material mixture layer 11.

Figure 3:
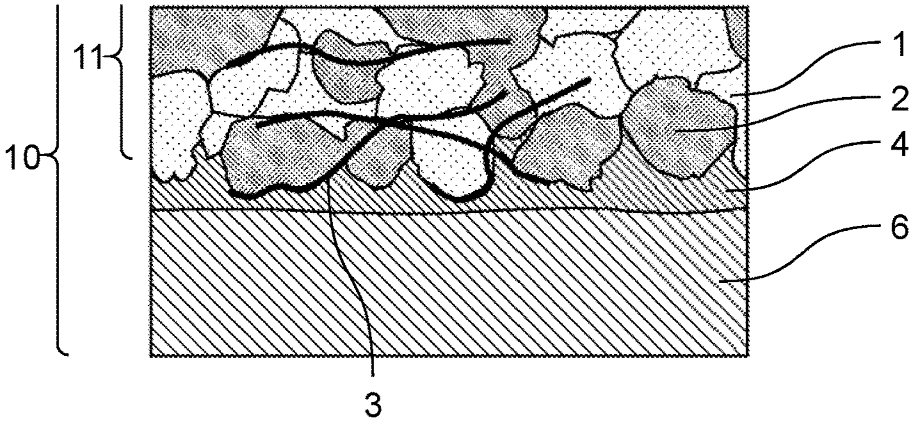
FIG. 3 is a schematic view showing a cross section near an interface between a positive electrode junction layer and a positive electrode material mixture layer according to the embodiment.

For example, some conductive fibers 3 among plural conductive fibers 3 are interposed at an interface between positive electrode junction layer 4 and positive electrode material mixture layer 11. That is, regarding some conductive fibers 3, at least a part of the fibers is positioned between positive electrode junction layer 4 and positive electrode material mixture layer 11. FIG. 3 is a schematic view showing a cross section near the interface between positive electrode junction layer 4 and positive electrode material mixture layer 11 according to the present embodiment. Some conductive fibers 3 interposed at the interface between positive electrode junction layer 4 and positive electrode material mixture layer 11 include, for example, the following conductive fiber 3.

As shown in FIG. 3, a certain conductive fiber 3 connects, for example, positive electrode junction layer 4 (specifically, a conductive agent or a binder included in positive electrode junction layer 4) which will be described in detail later, and positive electrode active material 2 included in positive electrode material mixture layer 11. Conductive fiber 3 is entangled with positive electrode junction layer 4 and positive electrode active material 2, and thus connects positive electrode junction layer 4 and positive electrode active material 2. Positive electrode junction layer 4 and positive electrode active material 2 connected by conductive fiber 3 may be adjacent to each other. Conductive fiber 3 connecting positive electrode junction layer 4 and positive electrode active material 2 is an example of the second conductive fiber.

Another certain conductive fiber 3 connects positive electrode junction layer 4 and solid electrolyte 1 included in positive electrode material mixture layer 11. Conductive fiber 3 is entangled with positive electrode junction layer 4 and solid electrolyte 1, and thus connects positive electrode junction layer 4 and solid electrolyte 1. Positive electrode junction layer 4 and solid electrolyte 1 connected by conductive fiber 3 may be adjacent to each other. Conductive fiber 3 connecting positive electrode junction layer 4 and solid electrolyte 1 is an example of the third conductive fiber.

Here, an adhesion mechanism between positive electrode junction layer 4 and positive electrode material mixture layer 11 will be described. As shown in FIG. 3, positive electrode junction layer 4 and positive electrode material mixture layer 11 are mainly adhered to each other due to an anchor effect, the anchor effect is achieved by an conductive agent and a binder, which are materials of relatively soft positive electrode junction layer 4, being plastically deformed, and being embedded between positive electrode active materials 2, between solid electrolytes 1 and between positive electrode active materials 2 and solid electrolytes 1 in positive electrode material mixture layer 11.

The anchor effect refers to that a certain solid enters gaps of a material of an adhered member (an object to be bonded) or irregularities on a surface of the adhered member, and mechanical bonding occurs. The anchor effect is also called a fastener effect or an anchoring effect.

In the present embodiment, in addition to such an anchor effect, since a part of elongated conductive fibers 3 is sandwiched at the interface between positive electrode junction layer 4 and positive electrode material mixture layer 11 and is entangled with and fixed to positive electrode junction layer 4, and the other part of conductive fibers 3 is also entangled with the materials included in positive electrode material mixture layer 11, thus the adhesion between positive electrode junction layer 4 and positive electrode material mixture layer 11 is reinforced, and the adhesive strength at the interface between positive electrode junction layer 4 and positive electrode material mixture layer 11 is improved.

[2.1.2. Binder]

Positive electrode material mixture layer 11 according to the present embodiment does not include a binder.

The binder is an organic material that has no ion conductivity and electron conductivity and deteriorates charge and discharge characteristics of an all-solid-state battery, and is an adhesive that plays a role of adhering the materials in positive electrode material mixture layer 11 and adhering the positive electrode material mixture layer to other layers.

Since positive electrode material mixture layer 11 does not include a binder, the ion conductivity and the electron conductivity of positive electrode material mixture layer 11 are not inhibited, and thus all-solid-state battery 100 having a large battery capacity can be obtained.

Specifically, examples of the binder include, for example, synthetic rubber such as butadiene rubber, isoprene rubber, styrene-butadiene rubber (SBR), styrene-butadiene-styrene copolymer (SBS), styrene-ethylene-butadiene-styrene copolymer (SEBS), ethylene-propylene rubber, butyl rubber, chloroprene rubber, acrylonitrile-butadiene rubber, acrylic rubber, silicone rubber, fluororubber and urethane rubber; polyvinylidene fluoride (PVDF); polyvinylidene fluoride-hexafluoropropylene copolymer (PVDF-HFP); polyimide; polyamide; polyamide-imide; polyvinyl alcohol; and chlorinated polyethylene (CPE).

Since positive electrode material mixture layer 11 does not include a binder that serves as an adhesive, solid electrolyte 1 also serves as an adhesive. An adhesion mechanism of positive electrode layer 10 is as described in [2.1.1. Conductive Fibers].

An average concentration of the binder in any unit volume of positive electrode material mixture layer 11 is, for example, 100 ppm or less. That is, the concentration of the binder in positive electrode material mixture layer 11 is, for example, 100 ppm or less over the whole, which means that when positive electrode material mixture layer 11 is divided into unit volumes, the concentration of the binder is 100 ppm or less in any unit volume. That is, it means that there is no portion in positive electrode material mixture layer 11 where the concentration of the binder is higher than 100 ppm, the binder is evenly distributed in positive electrode material mixture layer 11, and substantially no binder is included over the whole positive electrode material mixture layer 11. In this case, since the concentration of the binder over the whole positive electrode material mixture layer 11 is 100 ppm or less, substantially no binder is included over the whole positive electrode material mixture layer 11, and the ion conductivity and the electron conductivity of positive electrode material mixture layer 11 are particularly less likely to be inhibited. In the present description, the concentration is a weight-based concentration unless otherwise specified.

A method for measuring the concentration of the binder is not particularly limited, and examples of the method for measuring the concentration of the binder include, for example, gas chromatography and a mass change method.

[2.1.3. Solvent]

The concentration of the solvent (specifically, the organic solvent) included in positive electrode material mixture layer 11 according to the present embodiment is 50 ppm or less, that is, positive electrode material mixture layer 11 substantially include no solvent.

Since positive electrode material mixture layer 11 does not include a binder, the ion conductivity and the electron conductivity of positive electrode material mixture layer 11 are not inhibited, and thus all-solid-state battery 100 having a large battery capacity can be obtained.

A method for measuring the concentration of the solvent is not particularly limited, and examples of the method can include, for example, gas chromatography and a mass change method.

Examples of the organic solvent can include, for example, a non-polar organic solvent, a polar organic solvent, or a combination thereof. Examples of the non-polar organic solvent can include, for example, heptane, xylene, toluene, or a combination thereof. Examples of the polar organic solvent can include, for example, a tertiary amine-based solvent, an ether-based solvent, a thiol-based solvent, an ester-based solvent, or a combination thereof. Examples of the tertiary amine-based solvent can include, for example, triethylamine, tributylamine, triamylamine, examples of the ether-based solvent include, for example, tetrahydrofuran, cyclopentylmethyl ether, examples of the thiol-based solvent include, for example, ethane mercaptan, and examples of the ester-based solvent include, for example, butyl butyrate, ethyl acetate, butyl acetate, or a combination thereof.

Examples of an organic solvent used for preparing a slurry of a positive electrode material mixture include, for example, hydrocarbon-based organic solvents such as heptane, toluene, and hexane, and a hydrocarbon-based organic solvent that is dehydrated to reduce water content is used.

[2.1.4. Positive Electrode Active Material]

Next, positive electrode active material 2 according to the present embodiment will be described.

Positive electrode active material 2 is a substance in which metal ions such as lithium (Li) are inserted into or removed from a crystal structure at a higher potential than a negative electrode layer, and oxidation or reduction is performed with the insertion or removal of the metal ions such as lithium. A type of positive electrode active material 2 is appropriately selected according to the type of the all-solid-state battery, and for example, an oxide active material, a sulfide active material and the like are mentioned.

For example, an oxide active material (lithium-containing transition metal oxide) is used as positive electrode active material 2 according to the present embodiment. Examples of the oxide active material include $LiCoO_2$, $L_1NiO_2$, $LiMn_2O_4$, $LiCoPO_4$, $LiNiPO_4$, $LiFePO_4$, $LiMnPO_4$, and a compound obtained by substituting a transition metal of the above compounds with one or two different elements. Known materials such as $LiNi_{1/3}Co_{1/3}Mn_{1/3}O_2$, $LiNi_{0.8}Co_{0.15}Al_{0.05}O_2$, and $LiNi_{0.5}Mn_{1.5}O_2$ are used as the compound obtained by substituting the transition metal of the above compounds with one or two different elements. As positive electrode active material 2, one type or a combination of two or more types thereof may be used.

Examples of a shape of positive electrode active material 2 include a particle shape and a thin film shape. Positive electrode active material 2 is composed of, for example, a plurality of particles. When positive electrode active material 2 is composed of a plurality of particles, an average particle size ($D_{50}$) of the positive electrode active material is, for example, in a range of 50 nm or more and 50 μm or less, and may be in a range of 1 μm or more and 15 μm or less. Handleability is more likely to be favorable by setting the average particle size of the positive electrode active material to 50 nm or more, and on the other hand, flat positive electrode layer 10 is more likely to be obtained by setting the average particle size of the positive electrode active material to 50 μm or less. The "average particle size" in the present description is an average diameter on a volume basis that is measured by a laser diffraction and scattering particle size distribution measuring device.

A ratio of solid electrolyte 1 to positive electrode active material 2 in positive electrode material mixture layer 11 is not particularly limited, for example, is within a range of 50:50 to 5:95 for the solid electrolyte: the positive electrode active material on a weight basis, and may be within a range of 30:70 to 5:95. It is easy to ensure both an ion conduction path and an electron conduction path in positive electrode layer 10 by setting the ratio within the range.

A surface of positive electrode active material 2 may be coated with a coating layer. The reason therefor is that a reaction between positive electrode active material 2 (for example, the oxide active material) and solid electrolyte 1 (for example, the sulfide-based solid electrolyte) can be restrained. Examples of a material of the coating layer include, for example, Li ion conductive oxide such as $LiNbO_3$, $Li_3PO_4$, and LiPON. An average thickness of the coating layer is, for example, within a range of 1 nm or more and 20 nm or less, and may be within a range of 1 nm or more and 10 nm or less.

[2.1.5. Solid Electrolyte]

Next, solid electrolyte 1 according to the present embodiment will be described.

Solid electrolyte 1 may be appropriately selected depending on conductive ion species (for example, lithium ions), and can be broadly classified into, for example, a sulfide-based solid electrolyte and an oxide-based solid electrolyte.

A type of the sulfide-based solid electrolyte according to the present embodiment is not particularly limited, and examples of the sulfide-based solid electrolyte include, for example, $Li_2S—SiS_2$, $LiI—Li_2S—SiS_2$, $LiI—Li_2S—P_2S_5$, $LiI—Li_2S—P_2O_5$, $LiI—Li_3PO_4—P_2S_5$ and $Li_2S—P_2S_5$, in particular, since the conductivity of lithium ions is excellent, the sulfide-based solid electrolyte preferably contains Li, P, and S. As the sulfide-based solid electrolyte, one type or a combination of two or more types thereof may be used. The sulfide-based solid electrolyte may be crystalline, amorphous, or glass-ceramic. The above description of "$Li_2S—P_2S_5$" means a sulfide-based solid electrolyte using a raw material composition containing $Li_2S$ and $P_2S_5$, and the same applies to other descriptions.

In the present embodiment, one form of the sulfide-based solid electrolyte is, for example, a sulfide glass ceramic containing $Li_2S$ and $P_2S_5$, and when a ratio of $Li_2S$ to $P_2S_5$ is set to $Li_2S/P_2S_5$=molar ratio on a molar basis, the molar ratio is preferably within a range of 2.3 or more and 4 or less, and more preferably in a range of 3 or more and 4 or less. The reason why this range of the molar ratio is preferable is that a crystal structure has high ion conductivity is obtained while maintaining a lithium concentration that affects the battery characteristics.

Next, the oxide-based solid electrolyte according to the present embodiment will be described. A type of the oxide-based solid electrolyte is not particularly limited, and examples thereof include, for example, LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}TiO_{0.74}$, $Li_{1.5}Al_{0.5}Ge_{1.5}(PO_4)_3$. As the oxide-based solid electrolyte, one type or a combination of two or more types thereof may be used.

Examples of a shape of solid electrolyte 1 according to the present embodiment include, for example, a thin film shape and a particle shape such as a true spherical shape and an elliptic spherical shape. Solid electrolyte 1 is composed of, for example, a plurality of particles. When solid electrolyte 1 is composed of a plurality of particles, the average particle size ($D_{50}$) of solid electrolyte 1 is not particularly limited, and in order to facilitate improvement of a filling rate in the positive electrode layer, the average particle size is, for example, 40 μm or less, and may be 20 μm or less, and may be 10 μm or less. On the other hand, an average particle size of solid electrolyte 1 is, for example, 0.001 μm or more, and may be 0.01 μm or more. The average particle size of solid electrolyte 1 can be determined, for example, by image analysis using a particle size distribution meter or a scanning electron microscope (SEM).

[2.2. Positive Electrode Junction Layer]

Next, positive electrode junction layer 4 according to the present embodiment will be described.

A function of positive electrode junction layer 4 is to bond positive electrode current collector 6 and positive electrode material mixture layer 11 via positive electrode junction layer 4. Positive electrode junction layer 4 includes a conductive agent as a main component and may also include a binder. Positive electrode junction layer 4 does not include, for example, positive electrode active material 2 and solid electrolyte 1.

In the present embodiment, since positive electrode material mixture layer 11 does not include a binder, when positive electrode layer 10 does not include positive electrode junction layer 4, an adhesive force between positive electrode current collector 6 and positive electrode material mixture layer 11 is weak, and a problem that peeling occurs at the interface is more likely to occur. Since the interface between positive electrode current collector 6 and positive electrode material mixture layer 11 requires more adhesive force, the adhesive force is reinforced by using positive electrode junction layer 4.

An adhesion mechanism between positive electrode junction layer 4 and positive electrode material mixture layer 11 is as described in [2.1.1. Conductive Fibers].

The conductive agents included in positive electrode junction layer 4 adhere to each other via the binder included in positive electrode junction layer 4 to maintain the shape.

Positive electrode junction layer 4 also adheres positive electrode current collector 6 via the binder included in positive electrode junction layer 4.

Positive electrode material mixture layer 11 and positive electrode current collector 6 perform electron conduction via positive electrode junction layer 4. In the all-solid-state battery, important properties for maintaining the battery capacity are the ion conductivity and the electron conductivity of positive electrode material mixture layer 11. In positive electrode junction layer 4, even if the electron conductivity is lowered due to the inclusion of the binder, the main component is a conductive agent and has sufficient electron conductivity to maintain the charge and discharge characteristics, so that the battery capacity of all-solid-state battery 100 is substantially not affected.

Examples of the conductive agent can include, for example, conductive carbon materials such as acetylene black, ketjen black (registered trademark), carbon black, graphite, and carbon fiber. As the conductive agent, one type or a combination of two or more types thereof may be used. As described above, for example, a conductive agent made of a non-metal that is not a metal is used as the conductive agent. By not using a metal as the conductive agent, it is possible to prevent problems such as a change in battery potential and problems such as metal corrosion. Further, by using a non-metal conductive agent that is relatively soft, the above-described anchor effect is more likely to be exhibited.

Specifically, examples of the binder include, for example, synthetic rubber such as butadiene rubber, isoprene rubber, styrene-butadiene rubber (SBR), styrene-butadiene-styrene copolymer (SBS), styrene-ethylene-butadiene-styrene copolymer (SEBS), ethylene-propylene rubber, butyl rubber, chloroprene rubber, acrylonitrile-butadiene rubber, acrylic rubber, silicone rubber, fluororubber and urethane rubber; polyvinylidene fluoride (PVDF); polyvinylidene fluoride-hexafluoropropylene copolymer (PVDF-HFP); polyimide; polyamide; polyamide-imide; polyvinyl alcohol; and chlorinated polyethylene (CPE).

A basis weight of positive electrode junction layer 4 is, for example, 0.1 $g/m^2$ or more and 10 $g/m^2$ or less. Since the anchor effect is more likely to be achieved in the junction between positive electrode junction layer 4 and positive electrode material mixture layer 11 and the adhesive force is reinforced by setting the basis weight of positive electrode junction layer 4 to 0.1 $g/m^2$ or more, the peeling of the interface between positive electrode junction layer 4 and positive electrode material mixture layer 11 can be prevented. Further, it is possible to avoid an increase in amount of positive electrode junction layer 4 while achieving the effect of improving the adhesive force between positive electrode junction layer 4 and positive electrode material mixture layer 11 by setting the basis weight of positive electrode junction layer 4 to 10 $g/m^2$ or less, and the cost can be reduced.

The basis weight of positive electrode junction layer 4 may be, for example, 0.3 $g/m^2$ or more and 3 $g/m^2$ or less. By setting the basis weight to 0.3 $g/m^2$ or more, the adhesive force between positive electrode junction layer 4 and positive electrode material mixture layer 11 is stronger, and sufficient adhesive force can be maintained even at 3 $g/m^2$ or less.

Here, the basis weight in the present disclosure is a weight per unit area of positive electrode junction layer 4 in a plan view in a main surface of positive electrode current collector 6 on which positive electrode junction layer 4 is formed.

A thickness of positive electrode junction layer 4 is, for example, within a range of 1 μm or more and 10 μm or less, and may be within a range of 2 μm or more and 6 μm or less. Since the anchor effect is more likely to be achieved in the junction between positive electrode junction layer 4 and positive electrode material mixture layer 11 and the adhesive force is reinforced by setting the thickness of positive electrode junction layer 4 to 1 μm or more, the peeling of the interface between positive electrode junction layer 4 and positive electrode material mixture layer 11 can be prevented. Further, it is possible to avoid an increase in amount of positive electrode junction layer 4 while achieving the effect of improving the adhesive force between positive electrode junction layer 4 and positive electrode material mixture layer 11 by setting the thickness of positive electrode junction layer 4 to 10 μm or less, and the cost can be reduced.

An amount of the binder included in positive electrode junction layer 4 is, for example, 0.1% by weight or more and 10% by weight or less. By setting the amount of binder included in positive electrode junction layer 4 to 0.1% by weight or more, positive electrode junction layer 4, positive electrode material mixture layer 11 and positive electrode current collector 6 are easily adhered, the peeling at the interfaces can be restricted. By setting the amount of binder included in positive electrode junction layer 4 to 10% by weight or less, the electron conductivity of positive electrode junction layer 4 is less likely to decrease, and the charge and discharge characteristics of the all-solid-state battery tends to improve.

[2.3. Positive Electrode Current Collector]

Positive electrode layer 10 according to the present embodiment includes, for example, positive electrode current collector 6 made of metal foil or the like. In positive electrode current collector 6, for example, a foil-shaped body, a plate-shaped body, a mesh-shaped body or the like made of aluminum, gold, platinum, zinc, copper, SUS, nickel, tin, titanium, or an alloy of two or more these is used.

A thickness and a shape of positive electrode current collector 6 may be appropriately selected depending on the use of the all-solid-state battery.

[2.4. Positive Electrode Layer Manufacturing Method]

A manufacturing method of positive electrode layer 10 according to the present embodiment will be described.

The manufacturing method of positive electrode layer 10 includes, for example, a positive electrode layer forming step. The positive electrode layer forming step is a step of forming positive electrode layer 10 including positive electrode material mixture layer 11 in which a concentration of the organic solvent is 50 ppm or less and a concentration of the binder is 100 ppm or less. The positive electrode layer forming step includes a positive electrode junction layer forming step, a positive electrode material mixture layer application step, and a positive electrode layer integrating step. In the positive electrode junction layer forming step, positive electrode junction layer 4 including at least a conductive agent is formed on at least one surface of positive electrode current collector 6. In the positive electrode material mixture layer application step, a positive electrode material mixture powder including at least solid electrolyte 1, positive electrode active material 2 and plural conductive fibers 3 is applied on a surface on which positive electrode junction layer 4 is formed. In the positive electrode layer integrating step, positive electrode layer 10 which is an integrated product of positive electrode current collector 6, positive electrode junction layer 4 and positive electrode material mixture layer 11 is formed by pressing the positive electrode material mixture powder.

The positive electrode junction layer forming step is a step of forming positive electrode junction layer 4 on positive electrode current collector 6. For example, positive electrode junction layer 4 is formed by applying a paste including a conductive agent and a binder onto positive electrode current collector 6 and drying the paste.

Next, in the positive electrode material mixture layer application step, first, solid electrolyte 1, positive electrode active material 2 and plural conductive fibers 3 are mixed and dispersed to prepare a positive electrode material mixture powder that does not include a solvent.

Positive electrode current collector 6 on which positive electrode junction layer 4 produced by the positive electrode junction layer forming step is formed is prepared.

Then, the produced positive electrode material mixture powder is applied on positive electrode junction layer 4. The positive electrode material mixture powder has a feature of including no binder, and a concentration of binder is 100 ppm or less.

As a method of applying the positive electrode material mixture powder on positive electrode junction layer 4, there is a method of coating a positive electrode material mixture powder including no organic solvent by using a vibration feeder, a table feeder or a screw feeder, or a method of electrostatic coating.

In addition, by using the above-described manufacturing method, since no organic solvent is used, a concentration of the organic solvent in positive electrode material mixture layer 11 is 50 ppm or less, and deterioration of solid electrolyte 1 due to the organic solvent also can be prevented.

Next, in the positive electrode layer integrating step, by pressing the positive electrode material mixture powder together with positive electrode current collector 6 and positive electrode junction layer 4 form above and below in a laminating direction, positive electrode layer 10 which is an integrated product of positive electrode material mixture layer 11, positive electrode junction layer 4, and positive electrode current collector 6 is produced. According to this pressing step, even if the binder serving as an adhesive is not included in positive electrode material mixture layer 11, solid electrolyte 1 can be used as an adhesive, and further, plural elongated conductive fibers 3 act as reinforcing materials, and even during subsequent manufacturing steps of all-solid-state battery 100, the positive electrode material mixture powder can be handled without falling off from positive electrode layer 10. The strength of positive electrode layer 10 as all-solid-state battery 100 is also improved. The pressing in the positive electrode layer integrating step may be heat pressing. Accordingly, positive electrode material mixture layer 11 having a higher density can be obtained.

Examples of the adhesion mechanism by solid electrolyte 1 can include the following two. (1) Solid electrolyte 1 and positive electrode active material 2 in positive electrode material mixture layer 11 are adhered to each other due to the anchor effect caused by solid electrolyte 1 being embedded in positive electrode active material 2. (2) Solid electrolytes 1 in positive electrode material mixture layer 11 adhere to each other due to intramolecular forces by being in close contact with each other, or adhere to each other due to the anchor effect caused by being embedded in each other. Since plural elongated conductive fibers 3 are fixed in a state of being entangled with positive electrode active material 2 and solid electrolyte 1, plural conductive fibers 3 serve as reinforcing materials.

Positive electrode junction layer 4 and positive electrode material mixture layer 11 are adhered to each other due to the anchor effect, the anchor effect is achieved by positive electrode junction layer 4 being plastically deformed, and being embedded between positive electrode active materials 2, between solid electrolytes 1 and between positive electrode active materials 2 and solid electrolytes 1 in positive electrode material mixture layer 11. Plural elongated conductive fibers 3 are sandwiched and fixed at the interface between positive electrode junction layer 4 and positive electrode material mixture layer 11, and are also entangled with the materials included in positive electrode material mixture layer 11, and thus the adhesion between positive electrode junction layer 4 and positive electrode material mixture layer 11 is reinforced.

A pressure of the pressing is, for example, 10 MPa or more and 2000 MPa or less. By setting the pressure of the pressing to 10 MPa or more, sufficient adhesive force can be obtained, and it is possible to prevent a problem that solid electrolyte 1 and positive electrode active material 2 fall off from positive electrode material mixture layer 11 during subsequent processes. Further, by setting the pressure of the pressing to 2000 MPa or less, the pressure is not too large, and it is possible to prevent a problem of breakage of positive electrode current collector 6.

The pressure of the pressing may be 400 MPa or more and 2000 MPa or less from the viewpoint of increasing a filling rate of positive electrode material mixture layer 11.

By increasing the filling rate of positive electrode material mixture layer 11, the ion conductivity and the electron conductivity of lithium ions or the like can be improved in positive electrode material mixture layer 11, and good battery characteristics can be achieved. The filling rate means a ratio of a volume of all substances occupying an object with respect to an apparent volume of the object. For example, the filling rate of positive electrode material mixture layer 11 means a ratio of a volume of all substances constituting positive electrode material mixture layer 11 with respect to an apparent volume of positive electrode material mixture layer 11.

A temperature of the pressing may be appropriately set depending on the materials included in positive electrode material mixture layer 11, for example, 20° C. or higher and 300° C. or lower. When the temperature of the pressing is 20° C. or higher, the included solid electrolyte 1 can be softened to improve the density of positive electrode material mixture layer 11. In addition, when the temperature of the pressing is 300° C. or lower, it is possible to prevent excessive progress of sintering due to overheating, and to sinter layers in a subsequent step of bonding the layers.

A pressing method in the above-described manufacturing method is not particularly limited, and a known pressing method may be adopted.

By using the method described above, even when the amount of solid electrolyte 1 that does not use a binder inhibiting the battery capacity and acts as an adhesive is reduced in order to increase the battery capacity, since positive electrode material mixture layer 11 includes plural elongated conductive fibers 3 that do not inhibit the battery capacity and thus positive electrode layer 10 can be reinforced, it is possible to achieve both the improvement of the battery capacity and the strength maintenance of positive electrode layer 10.

Further, since solid electrolyte 1 can be used as an adhesive and conductive fibers 3 can be used as reinforcing materials by the pressing, it is possible to prevent positive electrode active material 2 and solid electrolyte 1 from falling off from positive electrode material mixture layer 11, and it is possible to obtain all-solid-state battery 100 having a favorable battery capacity.

Since no organic solvent is used in a manufacturing process of positive electrode material mixture layer 11, positive electrode material mixture layer 11 substantially includes no organic solvent, so that deterioration of positive electrode material mixture layer 11 due to an organic solvent can be avoided and all-solid-state battery 100 having a favorable battery capacity can be manufactured.

[3. Negative Electrode Layer]

Although an effect is described by using plural conductive fibers 3 in positive electrode layer 10, the same effect also can be achieved by using plural conductive fibers 3 in negative electrode layer 20. That is, negative electrode layer 20 will described by replacing positive electrode active material 2 with a negative electrode active material in the description of the configurations of the respective layers of positive electrode layer 10 and the manufacturing method described above.

For example, the same material as positive electrode junction layer 4 is used for negative electrode junction layer 5, and the same material as positive electrode current collector 6 is used for negative electrode current collector 7. Differences between positive electrode material mixture layer 11 and negative electrode material mixture layer 21 will be described. As the negative electrode active material, for example, known materials can be used such as lithium, easily alloyed metals with lithium such as indium, tin, and silicon, carbon materials such as hard carbon and graphite, and oxide active materials such as $Li_4Ti_5O_{12}$ and $SiO_x$. As the negative electrode active material, a complex or the like in which the above-described negative electrode active materials are appropriately mixed may also be used.

A ratio of the solid electrolyte to the negative electrode active material is, for example, within a range of 60:40 to 5:95 for the solid electrolyte: the negative electrode active material on a weight basis, and may be within a range of 40:60 to 5:95. It is easy to ensure both the ion conduction path and the electron conduction path in the negative electrode layer when the ratio is within the range.

[4. Solid Electrolyte Layer]

Next, solid electrolyte layer 30 will be described. Solid electrolyte layer 30 according to the present embodiment includes at least a solid electrolyte having lithium ion conductivity. Solid electrolyte layer 30 may include a binder, and may substantially include no binder. When solid electrolyte layer 30 includes no binder, the solid electrolyte is used as an adhesive. The solid electrolytes are adhered to each other by sintering the solid electrolytes.

As the solid electrolyte included in solid electrolyte layer 30, a solid electrolyte similar to the above-described solid electrolyte 1 may be used.

Solid electrolyte layer 30 is produced, for example, by forming a film made of a material of solid electrolyte layer 30 and pressing the material of solid electrolyte layer 30 formed as a film. Solid electrolyte layer 30 may be formed on at least one of positive electrode material mixture layer 11 and the negative electrode material mixture layer 21 as a film, and may be stacked on at least one of positive electrode material mixture layer 11 and the negative electrode material mixture layer 21 after being formed on a substrate as a film.

(Other Embodiments)

As described above, the all-solid-state battery and the layers of the all-solid-state battery according to the present disclosure have been described based on the embodiment, but the present disclosure is not limited to the above embodiment. The above embodiment is an example, within the scope of the claims of the present disclosure, any object having substantially the same structure as the technical idea and having the same effect and function is included in the technical scope of the present disclosure. In addition, modifications of the embodiment conceived by a person skilled in the art and other embodiments that are constructed by combining some of the components in the embodiment are also included in the scope of the present disclosure without departing from the gist of the present disclosure.

For example, in the above embodiment, an example in which the ions conducting in all-solid-state battery 100 are lithium ions has been described, but the present disclosure is not limited thereto. The ions conducting in all-solid-state battery 100 may be ions other than the lithium ions such as sodium ions, magnesium ions, potassium ions, calcium ions, and copper ions.

For example, in all-solid-state battery 100, plural conductive fibers 3 may not be used in both positive electrode layer 10 and negative electrode layer 20, and plural conductive fibers 3 may be used in one of positive electrode layer 10 and negative electrode layer 20.

For example, in all-solid-state battery 100, positive electrode layer 10 includes positive electrode junction layer 4, and negative electrode layer 20 includes negative electrode junction layer 5, but the present disclosure is not limited thereto. All-solid-state battery 100 may include, instead of positive electrode layer 10, a positive electrode layer that is provided with positive electrode current collector 6 and positive electrode material mixture layer 11 which includes a binder and does not include plural conductive fibers 3, or may include, instead of negative electrode layer 20, a negative electrode layer that is provided with negative electrode current collector 7 and negative electrode material mixture layer 21 which includes a binder and does not include plural conductive fibers 3.

According to the present disclosure, both the high capacity of the all-solid-state battery and the strength maintenance of the electrode layer can be achieved.

The positive electrode layer and the negative electrode layer for the all-solid-state battery according to the present disclosure are expected to be applied to various batteries, such as a power source of such as a mobile electronic device and an in-vehicle battery.

What is claimed is:

1. An electrode layer to be used in an all-solid-state battery, the electrode layer comprising:
- an electrode current collector;
- an electrode junction layer including a conductive agent and disposed on the electrode current collector; and
- an electrode material mixture layer disposed on the electrode junction layer and including:
  - an electrode active material comprising a plurality of particles,
  - a solid electrolyte having ion conductivity, and
  - a plurality of conductive fibers,
- wherein the plurality of conductive fibers include:
  - a first conductive fiber connecting adjacent particles of the electrode active material,
  - a second conductive fiber located at an interface between the electrode junction layer and the electrode material mixture layer and connecting the electrode junction layer and the electrode active material of the electrode material mixture layer, and a third conductive fiber located at the interface between the electrode junction layer and the electrode material mixture layer and connecting the electrode junction layer and the solid electrolyte of the electrode material mixture layer, wherein a concentration of a binder contained in the electrode material mixture layer is 100 ppm or less, and a concentration of a solvent contained in the electrode material mixture layer is 50 ppm or less, and wherein a content of the plurality of conductive fibers is at least 0.01% by weight of a total weight of the electrode material mixture layer, and no more than 0.3% by weight of the total weight of the electrode material mixture layer.

2. The electrode layer of claim 1, wherein the first conductive fiber passes through the solid electrolyte between the adjacent particles of the electrode active material.

3. The electrode layer of claim 1, wherein the electrode layer is a positive electrode layer.

4. The electrode layer of claim 1, wherein the plurality of conductive fibers include a conductive fiber having a fiber diameter of 30 nm or less and a fiber length of 300 times or more the fiber diameter.

5. An all-solid-state battery comprising the electrode layer of claim 1.

6. The electrode layer of claim 1, wherein the electrode layer is a negative electrode layer.

7. The electrode layer according to claim 1, wherein:

the second conductive fiber includes at least a part positioned on an interface between the electrode junction layer and the electrode active material where the electrode junction layer and the electrode active material are in contact with each other, and the third conductive fiber includes at least a part positioned on an interface between the electrode junction layer and the solid electrolyte where the electrode junction layer and the solid electrolyte are in contact with each other.

* * * * *